Jan. 23, 1968    E. C. McDONOUGH ET AL    3,365,172
AIR COOLED SHROUD SEAL
Filed Nov. 2, 1966
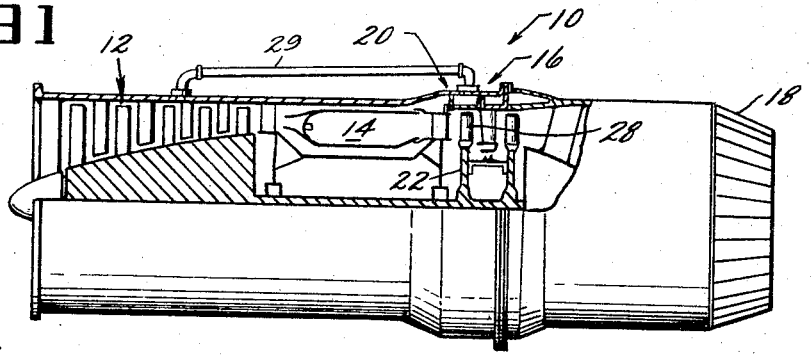
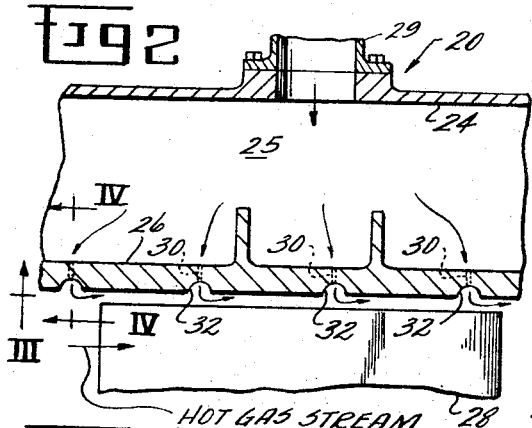
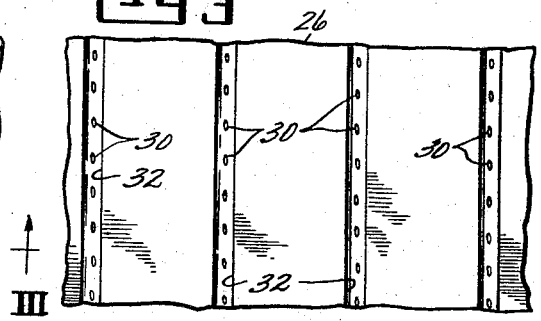
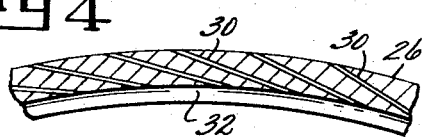
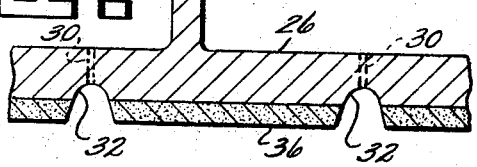
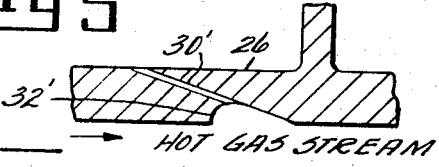
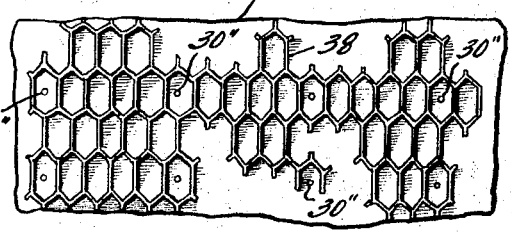
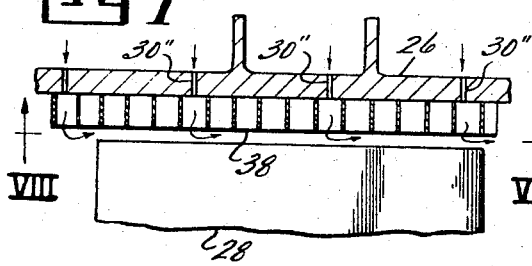
INVENTORS.
WERNER E. HOWALD
EDWARD C. McDONOUGH
BY
ATTORNEY 3,365,172
AIR COOLED SHROUD SEAL
Edward C. McDonough and Werner E. Howald, Cincinnati, Ohio, assignors to General Electric Company, a corporation of New York
Filed Nov. 2, 1966, Ser. No. 591,604
7 Claims. (Cl. 253—39.15)

ABSTRACT OF THE DISCLOSURE

A turbine shroud cooling mechanism provided by cooling air passing through small holes in the shroud. The holes open into circumferential grooves on the inner surface of the shroud to maintain the integrity of the holes in the event the tips of the turbine blades rub against the shroud. Cooling effectiveness is enhanced by angling the holes either tangentially or in a downstream direction. In another embodiment the holes are registered with the openings of honeycomb lining the inner surface of the shroud.

---

The present invention relates to improvements in gas turbine engines and more particularly to improvements in cooling the turbine portion of such engines.

In gas turbine engines of the type referred to, pressurized air is supplied to a combustor and supports combustion of fuel to generate an annular hot gas stream. This hot gas stream, generally speaking, then drives a turbine which powers a compressor for pressurizing the air delivered to the combustor. The hot gas stream may then power a second turbine or be discharged from a nozzle to obtain an energy output from the engine. The temperature of the gas stream entering the turbine, and particularly the compressor turbine, oftentimes exceeds the physical limitations of materials available for turbine construction. This has led to many different proposals for the provision of a coolant, usually in the form of low temperature air, for the components of the turbine.

Further detailing of the type of turbine referred to, a rotor is provided with radially extending blades projecting into the annular hot gas stream to be driven thereby. The free ends of the blades are encompassed by a cylindrical shell or shroud which is closely spaced therefrom. The shroud defines the outer boundary of the hot gas stream flowing past the blades and minimizes energy losses over the free ends of the rotating blades. While it has been recognized that coolant air must be supplied to all components of a turbine which are exposed to a high temperature gas stream, particular problems exist in cooling turbine shrouds with a relatively small amount of coolant air. In other words, while a turbine shroud may be kept below a desired maximum temperature, the coolant airflow has a noticeable and highly undesirable effect on the overall efficiency of the engine.

Recently devised techniques have greatly minimized the amount of cooling air required for many components of a turbine and particularly the turbine blades themselves. The basic principle of such improved cooling concepts is to employ small passageways for the introduction of cooling air into the boundary layer of the hot gas stream interface with the turbine component. These concepts have not been applicable to turbine shrouds, however, due to the fact that there is always the possibility of the free ends of the turbine blades rubbing against the shroud. This rubbing action often occurs without any serious damage to the turbine. While such an occurrence is not desirable, it is tolerated because of the greater desirability of maintaining a minimum clearance between free ends of the blade and the shroud. Such rubbing action usually happens when the engine is first run or broken in and seldom thereafter, once necessary clearances have been formed.

Recognizing that such rubbing action must be contemplated, it will be apparent that use of small passageways for boundary layer cooling of the shroud is ineffective since the rubbing action, described, can displace the shroud material and close off the cooling passageways thus preventing flow of the coolant to the hot inner surface of the shroud.

Accordingly, the object of the invention is to improve the operating efficiency of a gas turbine engine by more effective cooling of the turbine portion thereof, and more specifically to improve the efficiency of cooling a turbine shroud where there is a likelihood of rubbing between the rotating turbine blades and the shroud.

In accordance with one aspect of the invention, a turbine shroud is provided with a multiplicity of discrete relatively small holes angled toward the inner surface of the shroud with the holes opening into circumferential grooves formed on the inner surface of the shroud. With this arrangement, when a rubbing action occurs between the turbine blades and the shrouds, any displacement of metal will not result in the blocking of the cooling holes.

In another aspect of the invention, the shroud is provided with a multiplicity of small passageways therethrough, and the inner surface of the shroud is lined with an abradable honeycomb material. The openings through the shroud are registered with the openings of the honeycomb, whereby a rubbing action by the blade will result in distortion of the honeycomb without blocking the holes through which the coolant air passes.

The above and other related objects and features of the invention will be apparent from a reading of the following description of the disclosure found in the accompanying drawing, and the novelty thereof, pointed out in the appended claims.

In the drawing:

FIGURE 1 is a longitudinal half section of a diagrammatical representation of a gas turbine engine;

FIGURE 2 is an enlarged, fragmentary, longitudinal section of the outer portion of a turbine seen in FIGURE 1;

FIGURE 3 is a development taken on line III—III in FIGURE 2 and showing the inner surface of the turbine shroud;

FIGURE 4 is a section taken on line IV—IV in FIGURE 2;

FIGURE 5 is a fragmentary longitudinal section illustrating a modified shroud construction;

FIGURE 6 is a fragmentary longitudinal section illustrating another modified shroud construction;

FIGURE 7 is a fragmentary longitudinal section illustrating a further modified shroud construction; and FIGURE 8 is a developmnt taken on line VIII—VIII in FIGURE 7.

FIGURE 1 illustrates a conventional gas turbine engine 10, having an axial flow compressor 12, which pressurizes air to support combustion of fuel in a combustor 14. The hot gas stream, thus generated, then passes through and drives a turbine 16 which is connected to and powers the rotor of the compressor 12. The hot gas stream is then discharged through an exit nozzle 18 to provide a propulsive force, as where the engine is used in an aircraft installation.

The engine 10 comprises a compositely formed casing 20 which defines the outer boundary of the annular gas flow path through the engine. The inner-boundary of this annular flow path is formed by stationary and rotating components of the engine in a known fashion. As was noted above, the present invention deals with cooling of the turbine shroud which may be considered that part of the engine casing encompassing the bladed rotor 22 of the turbine 16. FIGURE 2 illustrates this shroud portion of the engine casing 20. It will be seen that the casing 20 at this point has an outer wall 24 which forms a chamber 25 surrounding the shroud element or shroud 26. The inner surface of the shroud 26 is closely spaced from blades 28 of the rotor 22. The chamber 25 is pressurized with cooling air illustratively shown as being derived from an intermediate compressor stage by conduit 29.

Cooling of the shroud 26 is provided by a multiplicity of holes 30 (FIGURES 2, 3 and 4) which are preferably arranged in circumferential rows spaced apart along the length of the shroud. It is also preferred that the holes be disposed with the axis of each row lying in a plane normal to the axis of the cylindrical shroud and further with their axis disposed substantially tangential to the inner surface of the shroud 26. Further, it is preferred that the holes of each row respectively open into circumferential grooves 32 formed on the inner surface of the shroud. With the described arrangement and preferably employing holes having a diameter in the order of .005 to .050 inch, a highly effective cooling action is obtained.

The grooves 32 are filled with cooling air in a fashion such that there is no substantial tendency for the air to be forced into the hot gas stream. Instead, the air can gently effuse into the boundary layer of the hot gas stream as it passes over the inner surface of the shroud 26. By introducing cooling air in this manner into the boundary air, maximum cooling effectiveness is obtained, inasmuch as there is little or no tendency to wastefully mix the cool air with the hot gas stream.

In addition to providing a highly effective cooling action, the described arrangement has the further benefit that in the event of a rub between the free ends of the blades 28 and the inner surface of the shroud 26, any displacement of the shroud material which might result from such a rubbing action would not have any effect on the cooling effectiveness. This is to say that the normal type of rub, which might be expected without permanently damaging the turbine components, would not be sufficient to wear away the grooves 32. The shroud material thus cannot be displaced to close off the holes 30.

FIGURE 5 illustrates another arrangement of cooling holes 30' which is also effective. The holes 30' are likewise arranged in spaced circumferential rows. However, the holes 30' are disposed at a relatively low angle to the inner surface of the shroud 26 in a direction downstream of the hot gas flow path. The grooves 32' are modified so that their downstream sides have this same low angle. With this arrangement an effective effusion of the cooling air into the hot gas stream boundary layer along the inner surface of the shroud is also maintained. Further, the advantages of the invention described above in the case of a rub are also the same.

FIGURE 6 illustrates a further modification of the invention wherein the inner surface of the shroud 26 has been lined with an abradable material 36 between the grooves 32. The abradable material 36 gives further protection to the base structural material 26 in the event of a rub. Otherwise this embodiment of the invention functions in the same fashion as previously described.

FIGURE 7 indicates a further modification of the shroud 26 wherein its inner surface is lined with a honeycombed structure 38. The honeycomb 38 may be fabricated in a known fashion from sheet material forming a plurality of cells. The cooling holes 30" are now disposed with their axes extending radially of the axis of the shroud and with the holes opening into the cells of the honeycomb structure 38 so that cooling air may pass therethrough, and due to the defuser action effectively cool the honeycomb. In the event of a rub, the honeycomb material may be deformed, but again the base structure of the shroud 26 will not be deformed and consequently the integrity of the holes 30" will be maintained and cooling air will continue to be provided after a rub occurs.

Other modifications will occur to those skilled in the art and the scope of the invention is therefore to be derived solely from the following claims.

Having thus described the invention what is claimed as novel and desired to be secured by Letters Patent of the United States is:

1. In a gas turbine engine,
   a turbine comprising a rotor having blades projecting radially therefrom, with their free ends spaced one from another,
   a shroud encompassing said rotor and defining the outer boundary of a hot gas stream which passes through said blades and drives said rotor,
   means for directing pressurized cooling gas to the exterior of said shroud,
   said shroud having relatively small cooling passageways therethrough and grooves on its inner surface into which the passageways open, said grooves having a width, in an axial direction, greater than that of the passageways opening therein, said grooves extending circumferentially a substantial distance at least in a direction opposite the direction of blade rotation,
   whereby the passageways will not be closed off in the event of a rub occurring between the rotor blades and the shroud during operation of the turbine.

2. In a gas turbine engine, a turbine as in claim 1 wherein,
   said passageways are in the form of a multiplicity of relatively small discrete holes arranged in longitudinally spaced circumferential rows, and inclined at a low angle relative to the inner surface of said shroud, and each groove extends around the full circumference of the shroud.

3. In a gas turbine engine, a turbine as in claim 2 wherein,
   the inner surface of said shroud, between said grooves, is lined with an abradable material.

4. In a gas turbine engine, a turbine as in claim 2 wherein said passageways have a diameter between .005 and .050 inch.

5. In a gas turbine engine,
   a turbine as in claim 4 wherein the axes of said passageways of each row are disposed in a plane transverse of said shroud.

6. In a gas turbine engine,
   a turbine as in claim 4 wherein,
   said holes are angled toward the inner surface of said shroud in a direction downstream of the hot gas flow path, and
   the downstream portions of said grooves are formed on the same angle as that of the holes.

7. In a gas turbine engine,
   a turbine comprising a rotor having blades projecting radially therefrom with their free ends spaced one from another,
   a shroud surrounding said rotor and defining the outer boundary of a hot gas stream which passes through said blades and drives said rotor,
   said shroud comprising an outer base member and an inner cellular honeycomb member closely spaced from the free ends of said rotor blades, said base member having passageways therethrough registered with said honeycomb openings said passageways being in the form of a multiplicity of discrete holes having a diameter between .005 and .050 inch, and means for directing pressurized cooling gas to the exterior of said base member so that the cooling gas passes through said passageways and through the cells of said honeycomb to thereby cool said shroud, the thickness of said honeycomb protecting the passageways of said base member from closure in the event of a rub between the rotor blades and the shroud.

References Cited

UNITED STATES PATENTS

| | | |
|---|---|---|
| 2,685,429 | 8/1954 | Auyer. |
| 2,720,356 | 10/1955 | Erwin. |
| 3,056,583 | 10/1962 | Varadi et al. _____ 253—77 X |

EVERETTE A. POWELL, JR., *Primary Examiner.*